Feb. 21, 1950        P. H. PELLEY        2,497,957
WINDOW FRAME
Filed April 5, 1946
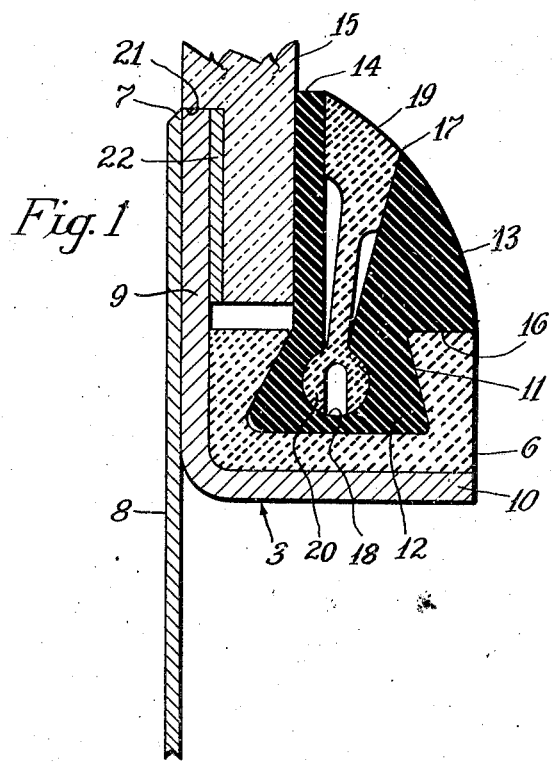
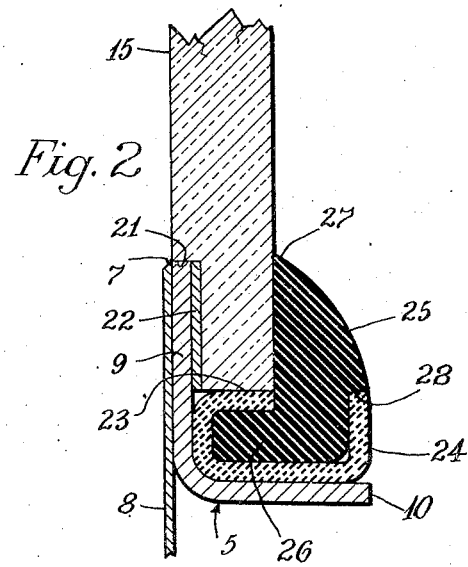
Perry H. Pelley
INVENTOR
BY
ATTORNEY Patented Feb. 21, 1950

2,497,957

UNITED STATES PATENT OFFICE 2,497,957

WINDOW FRAME

Perry H. Pelley, Wichita, Kans., assignor to Beech Aircraft Corporation, Wichita, Kans., a corporation of Delaware Application April 5, 1946, Serial No. 659,762

1 Claim. (Cl. 189—78)

The invention here disclosed relates to windows, particularly for aircraft.

In aircraft structures, the windows in many cases are curved, cut in various outlines and applied to surfaces of multiple curvature. Considerable difficulty and expense has been encountered in providing satisfactory frames for such windows.

Objects of the present invention are to provide window framing which can be readily adapted to the special requirements of such compound, curved window openings and which will be entirely safe, secure and practical in all respects.

Special objects are to provide a low cost form of window frame which can be made up as required and in any sizes and shapes to meet the needs of particular or unusual window designs and shapes.

Other desirable objects and the novel features through which the purposes of the invention are attained are set forth or will appear in the course of the following specification.

The drawing accompanying and forming part of the specification illustrates certain present commercial embodiments of the invention. The actual physical structure, however, may be modified and changed in certain respects, all within the true intent and broad scope of the invention as hereinafter defined and claimed.

Figure 1 in the drawing is a broken cross sectional view of a form of aircraft window frame embodying the invention.

Figure 2 is a similar view illustrating another form of the invention.

As shown in the drawing, the window frame consists of two main parts, a rigid frame 5 of substantially L-shaped cross section and a semirigid channel section 6 seated on and permanently secured in the angle of the rigid section.

The rigid section may be an L-shaped metal strip bent to closely fit about the window opening 7 in the wall 8 of the aircraft fuselage or other structure.

This L section piece affords what may be considered a normally upright flange 9 for attachment by riveting, welding or the like to the supporting structure 8 and a generally horizontal flange 10 for supporting the channel forming piece.

One flange reinforces the other, providing in practical effect a light weight, strong frame, easily shaped to different window outlines and simple or compound surface curvatures and which in its shaped form is rigid enough to meet all needs.

The semi-rigid channel 6 may be a plastic extrusion or the like, flexible enough to be readily conformable to the shape of the rigid frame member 5 and it may be secured seated in the angle of the L section by a bonding cement or other suitable means.

Preferably, the channel is of undercut formation so as to interlock with and secure the part or parts seated therein.

In Figure 1 the undercut channel 11 in the semi-rigid piece is shown as of dovetail section to receive the dovetail rib or key portion 12 on the base of a retainer strip 13. The latter may be of ductile material such as rubber extrusion and has an upright portion 14 bearing against the glass 15 and a lateral shoulder 16 bearing on the outer edge of the channel piece.

Also this particular form of molding strip is made with a deep inwardly tapering slot 17 terminating down in the key portion in a circular cavity 18 to receive a wedge shaped locking strip 19 having a split bulbous portion 20 along the inner edge interlocking in the circular cavity.

The wedge shaped locking strip may be made of semi-rigid material so as to be readily placeable in and removable when required from the retainer strip.

In the assembly of this particular form of the invention, the window 15, which may be shouldered at 21 to fit over the edge of the upright flange of the frame, is set in place, usually against a sealing strip 22. The ductile retainer strip is then forced in place, the split and hollowed structure of the same facilitating engagement of the key portion of the same in the undercut groove of the frame and finally the locking strip is wedged in place, the split formation facilitating entry of the bulbous inner edge into the locking cavity in the keying rib 12.

In the second form of the invention illustrated, the undercut effect is obtained by folding the inner upstanding flange 23 over the groove in the channel piece 24.

The molding in this case consists of a single retainer strip 25 having a laterally extending key portion 26 to interlock beneath the overstanding flange 23 and having, like the first retainer, an upstanding portion 27 bearing against the glass and a laterally extending shoulder 28 bearing on the inner flange of the channel.

The retainer strip in this second illustrated form of the invention may be a rubber extrusion, ductile enough to be forced into the interlocked relation illustrated and to be removed from its seated, holding position, when required.

The rigid L section frames and attached semi-rigid channels can be made up at low cost to meet practically any requirements. As shown, they can be designed for different kinds of retainer moldings and in all forms the structure is simple and practical.

What is claimed is:

A window frame construction for window openings of various curvatures and comprising a light, rigid frame of L-shaped cross section having an upstanding flange curved to fit the curvature of the surface surrounding a window opening and an outstanding flange projecting laterally therefrom to form a support, a channel strip of semi-rigid material conformed to the curvature of the rigid frame and seated in the angle of said L-shaped cross section frame in abutting engagement with both the upright and the laterally projecting flanges of the rigid frame, a window pane engaged against the upright flange of the L-shaped cross section frame over said channel strip, said semi-rigid channel strip having inner and outer flanges defining the channel therein and the inner one of said flanges being overturned over the channel and substantially flat to form a seating surface for the edge of the window pane overstanding the same and a window retaining strip of ductile material engaged in said channel strip and having a rib engaged beneath said overturned inner flange of the channel strip, a shoulder bearing on the outer flange of the channel strip and an upstanding portion bearing against the inner face of the window pane.

PERRY H. PELLEY.

REFERENCES CITED

The following references are of record in the file of this patent:

UNITED STATES PATENTS

| Number | Name | Date |
|---|---|---|
| 2,205,538 | Owen | June 25, 1940 |
| 2,358,485 | Warren et al. | Sept. 19, 1944 |